United States Patent [19]

van der Lely

[11] 3,984,018
[45] Oct. 5, 1976

[54] VEHICLES FOR AGRICULTURAL AND OTHER PURPOSES

[76] Inventor: Cornelius van der Lely, 7, Bruschenrain,, Zug, Switzerland

[22] Filed: Apr. 1, 1974

[21] Appl. No.: 456,676

[30] Foreign Application Priority Data
Apr. 4, 1973  Netherlands ............... 7304647

[52] U.S. Cl. .................................. 214/518; 280/467
[51] Int. Cl.² ........................................... B60P 1/50
[58] Field of Search ............. 214/518, 147 G, 78, 214/79, 80, 77 R, 90 R, 90 A; 280/423 R, 104.5 R, 462; 296/104

[56] References Cited
UNITED STATES PATENTS

| | | | |
|---|---|---|---|
| 1,863,957 | 6/1932 | Woolcott | 296/105 |
| 2,405,755 | 8/1946 | Rodefeld | 214/78 |
| 3,003,780 | 10/1961 | Lundahl | 280/104.5 R X |
| 3,126,224 | 3/1964 | Carter | 296/104 |
| 3,730,367 | 5/1973 | Heffington | 214/518 |
| 3,800,966 | 4/1974 | Newton | 280/423 R |
| 3,841,504 | 10/1974 | Spasuik | 214/78 |

FOREIGN PATENTS OR APPLICATIONS
1,577,020  6/1969  France ................... 214/78

*Primary Examiner*—M. H. Wood, Jr.
*Assistant Examiner*—R. Schrecengost
*Attorney, Agent, or Firm*—Mason, Mason & Albright

[57] ABSTRACT

An agricultural vehicle has a wheeled frame and a load-receiving chamber enclosed by a framework. A loading mechanism comprising upper and lower gripper members actuated by hydraulic pistons of a control system is mounted at one end of the chamber near an open side. The gripper members can include curved tines, with or without blades, that can be moved to pick up and load crop material in the chamber. A draw bar is pivoted to the frame laterally thereof. The draw bar can be a hydraulically actuated parallelogram linkage that is connected below the gripper members and pivoted to the frame via a connecting piece linkage so that upon actuation, the frame together with the gripper members can be raised and lowered. A conveyor floor can be located at the bottom of the chamber and one or more rotary spreaders located to distribute material from the chamber. The spreaders, conveyor floor and pump in the hydraulic system can be connected to the p.t.o. of a tractor when the latter is hitched to the vehicle's draw bar.

26 Claims, 10 Drawing Figures

VEHICLES FOR AGRICULTURAL AND OTHER PURPOSES

According to one aspect of the invention, there is provided a vehicle of the kind set forth, wherein the loading mechanism comprises two gripper members both arranged near a mouth or like receiving region of a load-receiving chamber of the vehicle in such a way that they can be employed to pick up or otherwise collect material from the ground or from a stack, heap or the like thereof and displace the picked up or otherwise collected material directly into the load-receiving chamber.

BRIEF DESCRIPTION OF THE DRAWINGS

For a better understanding of the invention, and to show how the same may be carried into effect, reference will now be made, by way of example, to the accompanying drawings, in which.

DESCRIPTION OF THE PREFERRED EMBODIMENTS

Figure 1:
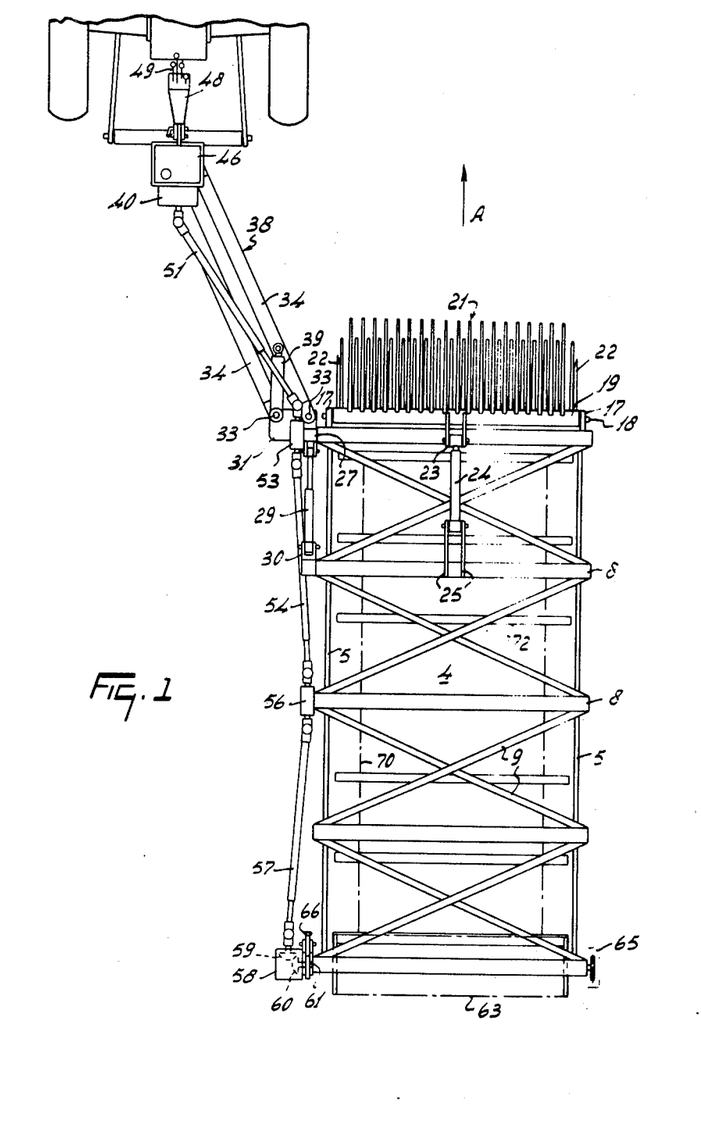
FIG. 1 is a plan view of a pick-up vehicle in accordance with the invention connected to the rear of an agricultural tractor.
Figures 2, 3:
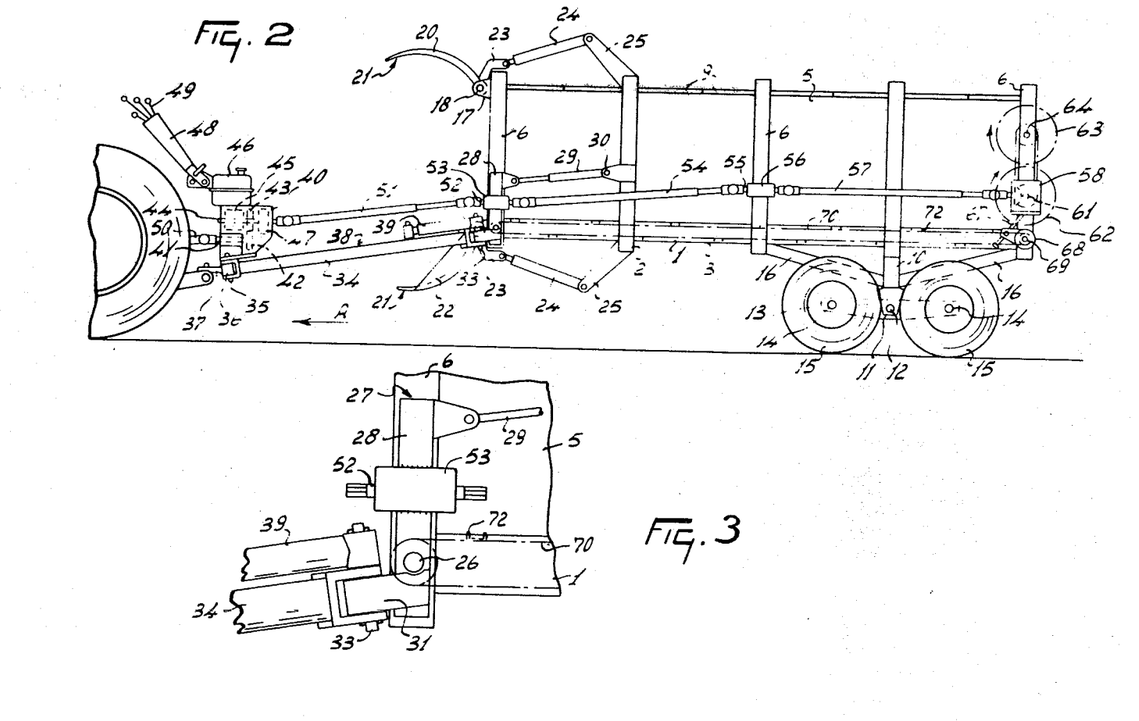
FIG. 2 is a side elevation corresponding to FIG. 1.
FIG. 3 is a partial side elevation, to an enlarged scale, illustrating the construction and arrangement of a draw bar connection and other parts in greater detail.

Referring to FIGS. 1 to 3 of the drawings, the pick-up vehicle that is illustrated is for agricultural purposes but it is emphasized that the invention is not limited solely to pick-up vehicles for such purposes and includes within its scope pick-up vehicles constructed and arranged for use in industrial, civil engineering and other operations. The vehicle shown in FIGS. 1 to 3 of the drawings has a frame which comprises two longitudinal beams 1 that extend substantially horizontally, substantially parallel to one another in space apart relationship and substantially parallel to the intended direction of operative travel of the vehicle which is indicated by an arrow A in FIGS. 1 and 2 of the drawings.

The frame beams 1 are interconnected at their opposite ends and at regularly spaced intervals therebetween by substantially horizontal transverse frame beams 2. A substantially horizontal cover plate forming the floor 3 of a load-receiving chamber 4 of the vehicle is disposed on the transverse beams 2, said chamber 4 also having side walls 5 that are vertically or substantially vertically disposed at opposite sides of the floor 3 so as to extend substantially parallel to the direction A. Upright supporting beams 6 that are provided with cover plates extend upwardly from junctions with the opposite ends of the transverse beams 2 in supporting relationship with the side walls 5 of the chamber 4. The uppermost ends of the beams 6 are interconnected by transverse roof beams 8 that extend substantially horizontally parallel to the transverse beams 2. Struts 9 are arranged in criss-cross relationship (see FIG. 1) between the upper ends of the beams 6 and the opposite ends of the beams 8, the arrangement being such that each strut 9 extends from one end of one of the roof beams 8 to the opposite end of the next beam 8 considered in the direction A.

The penultimate pair of supporting beams 6 with respect to the direction A have downward extensions 10, the lowermost ends of which are provided with corresponding forks 11. Each fork 11 has a corresponding support 13 pivotally mounted between its limbs with the aid of a corresponding stub shaft 12 that extends substantially horizontally perpendicular to the direction A. Each support 13 carries, adjacent its foremost and rearmost ends with respect to the direction A, two axle shafts 14 upon which corresponding ground wheels 15 are rotatably mounted. There are thus four of the ground wheels 15 arranged in two pairs at opposite sides of the vehicle with the two wheels in each pair located in tandem relationship, respectively in front of, and behind, the substantially common axis afforded by the two stub shafts 12 about which axis the supports 13 can rock pivotally. Each beam extension 10 is connected by two downwardly convergent struts 16 to the ends of the transverse beams 2 that are disposed in front of, and behind, with respect to the direction A, the beam 2 that is in register with the two extensions 10. The foremost supporting beams 6 with respect to the direction A are provided near both their upper and lower ends with forwardly projecting lugs 17. The lugs 17 are formed with holes and receive substantially horizontally aligned upper and lower pairs of stub shafts 18 arranged at the opposite ends of substantially horizontally extending and relatively parallel upper and lower tine supports 19. The tine supports 19 extend perpendicular, or at least transverse, to the direction A and are of tubular formation, each support 19 carrying a corresponding row of curved tines 20 that normally project in a generally forward direction from the supports 19 with respect to the direction A (see FIG. 2). Each tine 20 is of a substantially rigid formation, has a uniformly curved configuration and tapers progressively towards its free end or tip. As can be seen best in FIG. 1 of the drawings, the disposition of the tines 20 in the two rows thereof is such that, upon moving those tines in the manner that will be described below, those in one row thereof will be able to move between those in the other row thereof. Each tine support 19 and its row of tines 20 constitutes a corresponding gripper member 21 that is pivotable about the axis afforded by the corresponding pair of stub shafts 18. Upright blades 22 are arranged at the opposite ends of the row or tines 20 of the lower gripper member 21 so as to be turnable with that member about the corresponding pivotal axis. Each support 19 is provided, substantially midway along its length, with a pair of projecting arms 23 whose free ends are pivotally connected to the piston rod of a corresponding piston and cylinder assembly 24. The piston and cylinder assemblies 24 form parts of a hydraulic system of the pick-up vehicle but it should be noted that, for the sake of clarity, rigid and flexible ducts and other parts of that system have been omitted from the drawings. The ends of the cylinders of the assemblies 24 that are remote from the arms 23 are themselves pivotally mounted between pairs of inclined arms 25 carried substantially centrally along the seond transverse beam 2 and the second roof beam 8 respectively relative to the direction A. As viewed in plan (FIG. 1), the arms 25 extend substantially parallel to the direction A and are located in the immediate vicinity of a substantially vertical plane of approximate symmetry of the vehicle that extends parallel to the direction A.

An arm 27 is located at one side of the front of the frame of the vehicle with respect to the direction A and is located near the lower end of the left and foremost supporting beam 6 when the vehicle is viewed from the rear in the direction A. The arm 27 is turnable around a substantially horizontal shaft 26 carried by the supporting beam 6 that has just been mentioned and comprises an upright portion 28 which is pivotally connected, near its uppermost end, to the free end of the piston rod of a hydraulic piston and cylinder assembly 29. The opposite end of the cylinder of assembly 29 is pivotally connected, in turn, to a bracket 30 mounted on the second supporting beam 6 from the front of the frame of the vehicle at the left-hand side thereof. The piston and cylinder assembly 29 also forms part of the hydraulic system of the vehicle as discussed above. In addition to the upright portion 28, the arm 27 includes a connecting portion 31 (FIG. 3) that projects forwardly from a lower end region of the portion 28 at an inclination which is substantially perpendicular, but actually a little in excess of 90°, to that portion 28. The front of the connecting portion 31 with respect to the direction A has two beams 34 turnable connected to it by corresponding upright pivot pins 33, said pins 33 being spaced apart from one another by a short distance in a direction that is horizontally perpendicular to the direction A (see FIG. 1 of the drawings). The leading ends of the two parallel beams 34 are turnably connected by corresponding upright pivot pins 35 to a coupling member 36 which includes a towing eye 37 or, as an alternative, a hook or other equivalent connecting piece. The connecting portion 31 of the arm 27, the coupling member 36 and the parallel beams 34 together afford a draw bar 38 which is in the form of a parallelogram linkage. The draw bar 38 is thus angularly adjustable in a substantially horizontal plane, a hydraulic piston and cylinder assembly 39 being provided to enable such adjustment to be effected. The assembly 39 forms part of the hydraulic system of the vehicle as discussed above and it can be seen from the drawings that its cylinder is pivotally mounted upon an upward extension of one of the pins 33 while the free end of its piston rod is pivotally connected to one of the beams 34, at a location between the ends thereof, by an upright pin rigidly secured to that beam. The two gripper members 21 comprise a loading mechanism of the vehicle and are arranged at the front, with respect to the direction A, of the parts defining the load-receiving chamber 4. The grippers 21 are movable upwardly and downwardly by the piston and cylinder assemblies 24 and the draw bar 38 is turnable upwardly and downwardly about the shaft 26 by the piston and cylinder assembly 29.

The coupling member 36 at the front of the draw bar 38 carries a gear box 40 from the front of which projects a splined or otherwise keyed rotary input shaft 41. The shaft 41 is provided, inside the gear box 40, with a toothed pinion 42 whose teeth are in driving mesh with those of a further pinion 43 mounted on a shaft 44 that is located above the shaft 41 but parallel thereto. The shaft 44 forms the drive shaft of a hydraulic pump 45 that is part of the hydraulic system of the vehicle, a reservoir 46 for oil or other hydraulic pressure medium being mounted on top of the gear box 40 and being in communication with the pump 45 by ducts which, as mentioned above, are not illustrated in the drawings for the sake of simplicity. The shaft 44 also communicates by way of a coupling 47, which may be a slip coupling or other coupling having control means that are not shown in the drawings with a coaxial rotary output shaft having a splined or otherwise keyed end projecting from the rear of the gear box 40 with respect to the direction A. An arm 48 is adjustably connected to the front of the reservoir 46 and carries an array of control levers 49 for operating valves that will govern the action of the two hydraulic piston and cylinder assemblies 24, the single assembly 29 and the single assembly 39, all of those assemblies being double-acting assemblies. The control levers 49 are positioned so that they will be readily accessible to the driver of an operating tractor or other vehicle, as illustrated in the drawings, the adjustable mounting of the arm 48 being provided to facilitate matching the position of the arm 48 to different tractors and other towing vehicles.

The rotary input shaft 41 is arranged to be placed in driven connection with the power-take-off shaft of the tractor or other vehicle which both tows and operates it, during the use thereof, by way of an intermediate telescopic transmission shaft 50 of a construction that is known per se having universal joints at its opposite ends. The rotary output shaft of the gear box 40 is arranged to co-operate with a further similar telescopic transmission shaft 51 having universal joints at its opposite ends in transmitting drive to a rotary shaft 52 mounted in a bearing assembly 53 having a casing which is rigidly secured to the upright portion 28 of the arm 27. As can be seen in FIG. 3 of the drawings, the shaft 52 is splined or otherwise keyed at both ends and is arranged to drive a further similar telescopic transmission shaft 54 which, in turn, drives a shaft 55 rotatably mounted in a bearing assembly 56, housing is secured to the supporting beam 6 at the left side of the vehicle that is third from the front of the frame thereof with respect to the direction A. The shaft 55 and bearing assembly 56 are similar to the parts 52/53 that have already been described and that can be seen to an enlarged scale in FIG. 3 of the drawings. The rearmost end of the rotary shaft 55 with respect to the direction A transmits drive to a still further similar telescopic transmission shaft 57 having a rearmost end which is connected to a short shaft rotatably journalled in a gear box 58. The shaft which has just been mentioned carries, inside the gear box 58, a bevel pinion 59 having teeth which are in driving mesh with those of a bevel pinion 60 mounted on a stub shaft 61 forming part of a spreading member 62 that is rotatable about a substantially horizontal axis extending substantially perpendicular to the direction A. The spreading member 62 is rotatably mounted between the rearmost pair of supporting beams 6 with respect to the direction A and it will be seen from FIG. 2 of the drawings that a second similar spreading member 63 is also mounted between the same beams 6 at a level above that of the spreading member 62. The spreading member 63 has stub shafts 64 at its opposite ends which establish rotary connections with the beams 6, the stub shaft 64 at the right-hand end of the spreading member 63 when the vehicle is viewed from the rear in the direction A being provided with a sprocket wheel which is driven from a sprocket wheel carried by the stub shaft 61 at the same end of the underlying spreading member 62 through the intermediary of a transmission chain, said sprocket wheels and transmission chain being contained within a protective casing 65. The arrangement is such that the two spreading members 62 and 63 can be rotated, during the operation of the vehicle, in the directions that are indicated by arrows in FIG. 2 of the drawings around axes that are parallel or substantially parallel to one another. The two spreading members 62 and 63 may conveniently be of drum-like or other cylindrical configuration and are provided with projecting tines and/or cutter blades or the like.

The stub shaft 61 that is at the end of the spreading member 62 adjacent to the gear box 58 is provided, between the spreading member and the gear box, with an eccentrically mounted disc 66 rotatably surrounded by a ring to which is connected a rod 67. The rod 67 is coupled, in a manner that is known per se, to the driving pawl of a pawl and ratchet wheel mechanism 68. The mechanism 68 which has just been mentioned is arranged at one end of a shaft 69 that extends substantially horizontally perpendicular to the direction A between the rearmost pair of supporting beams 6 at a level just above that of the floor 3. Sprocket wheels are carried by the shaft 69 between the beams 6 and further similarly positioned sprocket wheels are carried by a portion of the previously mentioned shaft 6 that extends between the pair of supporting beams 26 that are disposed at the front of the load-receiving chamber 4. Endless transmission chains 70 are passed around the sprocket wheels on the shafts 69 and 26 and said chains are transversely interconnected, at regular intervals along their lengths, by bars or girders being arranged in such a way that, in upper runs of the chains 72, their flanges project upwardly from their substantially horizontally disposed webs or bases. The load-receiving chamber 4 of the vehicle is thus furnished with a moving floor or endless conveyor with a effective surface which is disposed at a level a little above that of the fixed floor 3, the lower or return run of the moving floor or endless conveyor being arranged immediately above the fixed floor 3.

The pick-up vehicle that has been described is a trailer vehicle and, in the use thereof, the towing eye 37 or equivalent connection piece is coupled by a pin or the like to the tow bar or tool bar of the agricultural tractor or other vehicle that is to tow and operate the vehicle. The draw bar 38 may occupy the position shown in FIG. 1 of the drawings in which the path of travel of the loading mechanism of the vehicle is located immediately to the right-hand side of the path of travel of the operating tractor itself. The gripper members 21 can pick up crop or other material directly from the ground or from a stack or heap thereof and push such crop or other material directly into the interior of the chamber 4 without the necessity for any separate feeding mechanism. The control levers 49 can be operated from the driving seat of the tractor to govern the operation of the various double-acting piston and cylinder assemblies that have been described and, in particular, the two gripper members 21 can be operated individually or in common to engage material that is to be loaded and push it rearwardly into the chamber 4. The two gripper members 21 are located at the uppermost and lowermost edges of the mouth of the chamber 4 at the front thereof with respect to the direction A. The lower gripper member 21, which incorporates the upright cutting blades 22, can be employed to pick up material directly from the ground or to pick it up from a stack or the like. The lower gripper member 21 can be turned sufficiently far around the axis of the corresponding stub shafts 18 to bring its tines 21 into a leading region of the chamber 4 and the two gripper members 21 can be used in an advantageous manner by employing them alternately to push new quantities of material into the chamber 4. Such quantities of material act to puch previously engaged quantities thereof further to the rear in the chamber 4. If quicker and more positive rearward displacement of the material in the chamber 4 is required, the shaft 69 may be driven by the pawl and ratchet wheel mechanism 68 to cause the moving floor or endless conveyor upon which the material is resting to move slowly but progressively rearwards through the chamber 4 with respect to the direction A. When crop or other material is to be picked up directly from the ground, it is advantageous that the tines 20 of the lower gripper member 21 should be capable of reaching closer to the ground surface than they can when the vehicle is disposed as illustrated in FIG. 2 of the drawings. The whole of the front of the load-receiving chamber 4 of the vehicle can be turned downwardly about the common axis of the stub shafts 12 to allow this to take place by operating the appropriate control lever 49 to cause a shortening of the piston and cylinder assembly 29. When such shortening takes place, the arm 27 is turned about the axis of the shaft 26 in a clockwise direction as seen in FIGS. 2 and 3 of the drawings and the front of the chamber 4 tilts downwardly to accommodate this turning movement.

During forward progress of the trailer vehicle in the direction A with simultaneous collection of crop or other material, the frame of the vehicle is subject to heavy forces tending to cause deformation. This is due, principally, to the offset position of the frame of the vehicle with respct to the towing and operating tractor as shown in FIG. 1 of the drawings. In order that the forces which have just been mentioned may be satisfactorily resisted, the walls and other boundaries of the load-receiving chamber 4 are stiffened to produce a high degree of resistance to torsional deformation. In the embodiment which has been described, this stiffening is afforded by the transverse beams 2, the upright supporting beams 6 and the roof beams 8 between which latter, in addition, the struts 9 are disposed in criss-cross relationship. When the gripper members 21 are employed together, rather than individually, they are capable of displacing in one step a quantity of material into the interior of the chamber 4 whose volume is a significant fraction of the total volume of the chamber 4 that is available to receive such material. When the chamber 4 is eventually completely filled, the two gripper members 21 that extend substantially throughout the width of the front of that chamber can be moved towards one another to close the front of the chamber, the tines 20 of the two rows thereof then intermeshing with one another as has been discussed above. The vehicle can then be towed to a field or the like where the contents of its chamber 4 is to be spread or otherwise discharged from that chamber. The spreading members 62 and 63 that are at the rear of the vehicle in the embodiment of FIGS. 1 to 3 of the drawings are employed for this purpose. Drive is imparted to those spreading members 62 and 63 from the gear box 40 so that they rotate in the directions indicated by the arrows in FIG. 2 of the drawings, the moving floor or endless conveyor being simultaneously operated to move slowly rearwards through the chamber 4 with respect to the direction A to supply the contents of that chamber progressively to the tines and/or blades of the rotating members 62 and 63. The particular arrangement of the four ground wheels 15 that has been described and that is illustrated in the accompanying drawings enables the vehicle to be used satisfactorily on surfaces of many different types including, in particular, rough and/or uneven ground. The vehicle can thus be used effectively on farm land of many different kinds and on building sites and the like. The tines 20 that have described as principal parts of the gripper members 21 may be replaced by tines of other shapes for better co-operation with materials that are not similar to hay, straw and the like. For example, blade-shaped tines may be used as alternatives.

Figure 4:
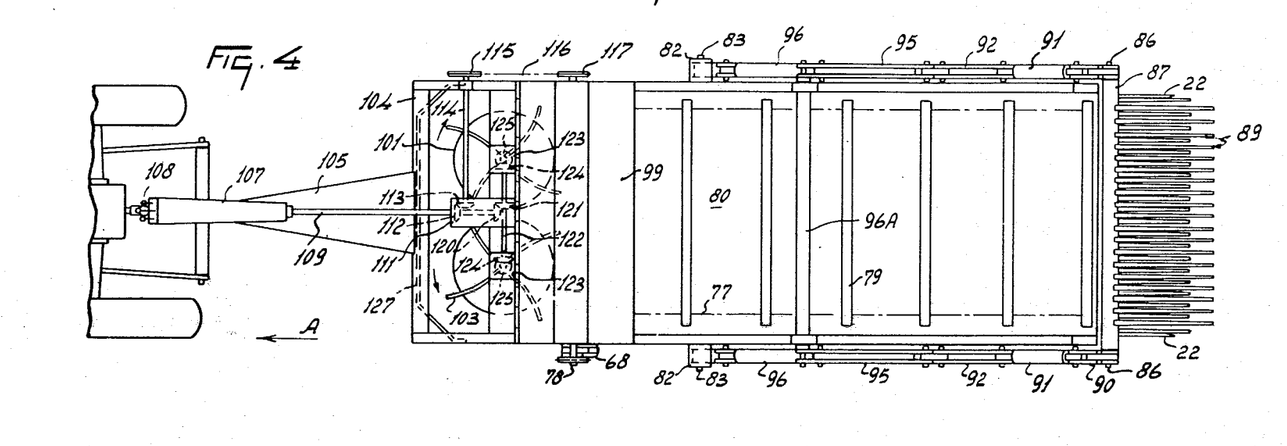
FIG. 4 is a plan view illustrating an alternative form of pick-up vehicle in accordance with the invention connected to the rear of an agricultural tractor.
Figure 5:
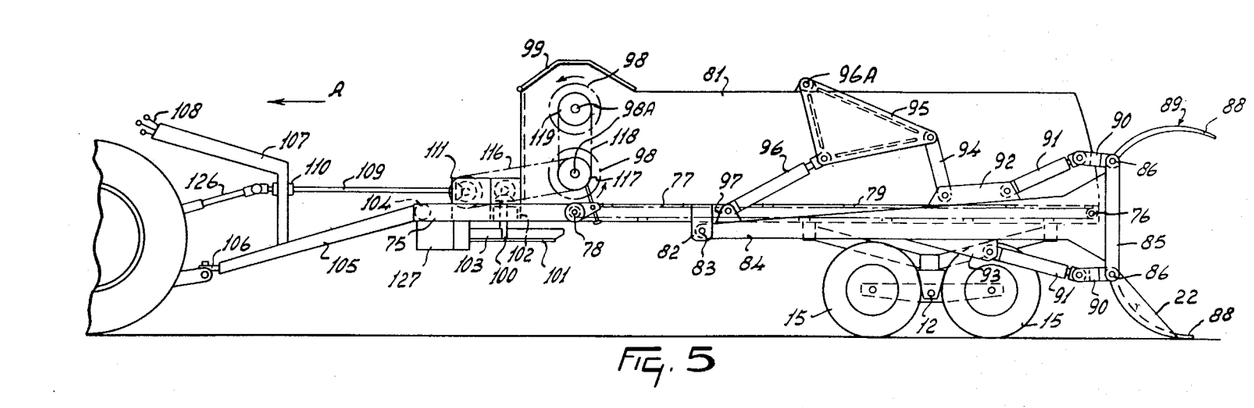
FIG. 5 is a side elevation corresponding to FIG. 4.

FIGS. 4 and 5 of the drawings illustrate an alternative pick-up vehicle in accordance with the invention which, once again, is an agricultural trailer vehicle. The vehicle has a frame which comprises substantially horizontal beams 75 that extend substantially parallel to the direction A in spaced apart relationship, a rotary shaft 76 being mounted between the rearmost ends of the beams 75 so as to extend substantially horizontally perpendicular to the direction A. A similarly disposed shaft 78 extends between the beams 75 at a location approximately a quarter of the way along the lengths of those beams from the leading ends thereof. The shafts 76 and 78 carry relatively spaced sprocket wheels that are in register in directions parallel to the direction A and around which endless chains 77 extend. The chains 77 are interconnected at regular intervals along their lengths by bars, girders or the like 79 that may be similar in construction and arrangement to the previously described bars or girders 72. An endless conveyor is thus formed with an upper run which effectively affords a moving floor to a load-receiving chamber 80 of the vehicle, said chamber 80 having a fixed floor disposed underneath the endless conveyor. The chamber 80 has upright side walls 81 that are supported by the frame beams 75 and it will be seen from the drawings that each frame beam 75 is provided, at a location a short distance in front of the midpoint thereof with respect to the direction A, with a depending forked support bracket 82. Arms 84 are pivotally mounted between the limbs of the forked brackets 82 with the aid of corresponding horizontally aligned pivot pins 83, said arms 84 forming parts of a supporting structure of a loading mechanism of the vehicle. The arms 84 become progressively greater in vertical extent towards the rear of the vehicle as the distance from the pivot pins 83 increases and said arms terminate in regions of maximum vertical extent (or width), said regions being provided with corresponding supports 85. As can be seen in FIG. 4 of the drawings, the supports 85 normally extend substantially perpendicular to the direction A, their upper and lower extremities turnable receiving stub shafts 86 at the opposite ends of tubular tine supports 87 forming parts of upper and lower gripper members 89 and each carrying a corresponding row of tines 88 that are similar in shape, construction and relative disposition to the previously described tines 20. As in the case of the tines 20, the tines 88 of the two rows thereof will intermesh with one another in appropriate angular settings of the gripper members 89 around the axes defined by the stub shafts 86.

Each of the four stub shafts 86 is provided with a pair of arms 90 that project from that stub shaft in a forward direction, with respect to the direction A, when the gripper members 89 occupy positions similar to those illustrated in FIGS. 4 and 5 of the drawings. The free ends of each pair of arms 90 have the free end of the piston rod of a corresponding hydraulic piston and cylinder assembly 91 pivotally mounted between them, the cylinders of said assemblies 91 being themselves pivotally connected to upper anchorages 92 and lower achorages 93 that are carried by the arms 84. It will be seen from FIG. 5 of the drawings that, at each side of the vehicle, there is one assembly 91 above the corresponding arm 84 and one assembly 91 below that arm. The upper anchorages 92 have arms 94 pivotally connected to them at the leading ends thereof with respect to the direction A, said arms 94 having their opposite and upper (as seen in FIG. 5) ends pivotally connected to the rearmost corners of corresponding substantially triangular plates 95. The uppermost (as seen in FIG. 5) corners of the plates 95 are pivotally connected to the opposite ends of a tube 96A that is fixedly mounted on top of the chamber 80 so as to extend substantially horizontally thereacross in a direction substantially perpendicular to the direction A. The tube 96A, which is actually secured to the upper edges of the side walls 81 of the chamber 80, extends parallel to the tine supports 87 of the gripper members 89. The third, and lowermost (as seen in FIG. 5) corner of each substantially triangular plate 95 is pivotally connected to the free end of the piston rod of a corresponding hydraulic piston and cylinder assembly 96, the cylinders of said assemblies 96 being pivotally mounted between pairs of lungs 97 mounted on top of the arms 84 at short distances rearwardly from the pivot pins 83.

In a leading region of the chamber 80 with respect to the direction A, two rotary feeding members 98 are arranged one above the other in spaced apart relationship above the front end of the moving floor or endless conveyor at the bottom of the chamber 80. Each feeding member 98 revolves around an axis that is coincident with the longitudinal axes of stub shafts 98A at its opposite ends, said axes of rotation being parallel to one another. The feeding members may be of a basically cylindrical construction and preferably comprise tines and/or knife blades arranged to assist in displacing material contained within the chamber 80 to a spreading mechanism which comprises two distributors 101 that are located in front of the feeding members 98 with respect to the direction A so as to be capable of revolving around corresponding vertical or substantially vertical axes. It will be noted that a pivotable screen 99 is arranged over the rotary feeding members 98 at the front of the load-receiving chamber 80. The axes about which the distributors 101 are rotatable are afforded by substantially vertical shafts 100 journalled in bearings carried by a transverse beam 102 that interconnects the frame beams 75. Each distributor 101 comprises a circular disc carrying four spreading blades 103 on its upper surface, said blades 103 extending outwardly from the corresponding shaft 100 to locations beyond the periphery of the disc and being uniformly curved in such a way that the convex side of each blade is foremost with respect to the intended direction of rotation of the corresponding distributor 101, the intended directions of rotation being indicated by arrows in FIG. 4 of the drawings. The blades 103, of course, angularly spaced apart from one another at regular intervals of 90° around the axes of the corresponding shafts 100.

The leading end of the two frame beams 75 with respect to the direction A are perpendicularly interconnected by a frame beam 104, a draw bar 105 of generally triangular configuration being fastened to the beam 104 by its shortest side in such a way that, as seen in side elevation (FIG. 5), the draw bar is inclined downwardly and forwardly away from the beam 104, a towing eye 106 being provided at its leading end for co-operation with the tow bar or tool bar of a towing operating agricultural tractor or other vehicle. A hook or other coupling member could, of course, be substituted for the towing eye 106. An arn 107 is mounted on top of the draw bar 105 and its uppermost and foremost end with respect to the direction A houses an array of control levers 108 arranged to operate valves for initiating extensions and retractions of the various piston and cylinder assemblies 91 and 96 that have been mentioned. As in the preceding embodiment, the various rigid and flexible hydraulic ducts, hoses and the like are omitted from the drawings for the sake of simplicity but, in this embodiment, the hydraulic system of the vehicle comprises connection means (not shown) by which it may be releasably coupled to the hydraulic system of the operating tractor or other towing vehicle thus rendering parts equivalent to the previously described parts 45 and 46 unnecessary. The endless conveyor, the feeding members 98 and the distributors 101 are driven from a shaft 109 which has a leading end region rotatably mounted in a bearing 110 carried by the arm 107 and a rearmost end is located in a gear box 111 fastened to the beam 102. The portion of the shaft 109 that is located inside the gear box 111 carries a bevel pinion 112 with teeth are in driving mesh with those of a further bevel pinion 113 mounted on a shaft 114 which extends laterally from said gear box through a bearing carried on top of the beam 75 at one side of the vehicle. The shaft 114 is provided, immediately beyond the bearing which has just been mentioned, with a sprocket wheel 115 which, by way of an endless transmission chain 116, drives a further sprocket wheel 117 mounted on the stub shaft 98A at the corresponding end of the lower rotary feeding member 98. The stub shaft 98A at the opposite end of the lower feeding member 98 carries a second sprocket wheel 117 which transmits drive to a sprocket wheel 119 mounted on the stub shaft 98A at the same end of the upper feeding member 98 by way of an endless transmission chain 118.

A second bevel pinion 120 is carried by the shaft 109 inside the gear box 111 and this second bevel pinion 120 has its teeth in driving mesh with those of a bevel pinion 121 carried by a shaft 122 that extends through the gear box 111 in a direction substantially horizontally perpendicular to the direction A. The opposite ends of the shaft 122 are disposed in two smaller gear boxes 123 that are carried by the beam 102 and carry bevel pinions 124, the teeth of which are in driving mesh with those of bevel pinions 125 secured to the upper ends of the shafts 100 which both enter the corresponding gear boxes 123. The shaft 78 at the leading end of the moving floor or endless conveyor of the load-receiving chamber 80 is driven from an eccentric disc mounted on one of the lower stub shafts 98A and a co-operating pawl and ratchet wheel mechanism 68 at the corresponding end of the shaft 78 in a substantially identical manner to that which has already been described with reference to FIGS. 1 to 3 of the drawings. Rotary drive is transmitted to the leading end of the shaft 109, during the use of the trailer vehicle, from the power take-off shaft of the co-operating agricultural tractor or other towing vehicle through the intermediary of a telescopic transmission shaft 126 of a construction that is known per se having universal joints at its opposite ends.

In the use of the agricultural trailer vehicle which has been described with reference to FIGS. 4 and 5 of the drawings, the loading mechanism which comprises the gripper members 89 that are disposed at the rear end of the load-receiving chamber 80 of the vehicle with respect to the direction A can pick crop and/or other agricultural materials up from the ground or from a stack or heap thereof in substantially the same manner as has been described with reference to FIGS. 1 to 3 of the drawings and can push such crop or other material directly forwards into the chamber 80 from the open rear end thereof. However, the gripper members 89 can be moved upwardly and downwardly relative to the rearwardly directed mouth of the chamber 80 by employing the hydraulic piston and cylinder assemblies 96 to turn said gripper members upwardly or downwardly, as may be required, about the axis that is defined by the pivot pins 83. The moving floor or endlesss conveyor at the bottom of the chamber 80 operates in an identical manner to that already described with reference to FIGS. 1 to 3 of the drawings with the exception that its upper effective run is arranged to move forwardly, rather than rearwardly, through the chamber 80 with respect to the direction A. Thus, crop or other agricultural material introduced into the chamber 80 by the loading mechanism at the rear end thereof can be moved progressively forwardly through that chamber by the endles conveyor or moving floor until the chamber is eventually completely filled. Extension and retraction of the piston rods of the assemblies 96 causes the triangular plates 95 to be turned about an axis substantially coincident with the longitudinal axis of the tube 96A so that the arms 84 are turned either upwardly, or downwardly, about the pivot pins 83 by the arms 94. This causes the gripper members 89 to be brought closer to, or further away from, the ground surface and it will be evident that a position can be adopted in which the piston rods of the assemblies 91 are extended to bring the tines 88 of the two rows thereof into intermeshing relationship, the assemblies 96 concurrently being brought to settings in which the intermeshing tines 88 will substantially close the open rear end of the chamber 80. A more or less full load of material can be towed to a field or other site at which it is to be spread and, upon towing the vehicle over that field or other site with the upper run of the endless conveyor or moving floor advancing slowly through the chamber 80 in the direction A, with the feeding members 98 rotating in the directions indicated by arrows in FIG. 5, and with the distributors 101 rotating in the directions indicated by arrows in FIG. 4, the contents of the chamber 80 will be progressively supplied by the feeding members to the upper surfaces of the distributors 101 from which that material will be centrifugally ejected onto the ground at both lateral sides of the vehicle. A guide or baffle 127 is provided in front of the distributors 101 with respect to the direction A at the same horizontal level as these distributors to ensure that the centrifugally ejected material is spread laterally of the vehicle with substantially none of it being thrown forwardly towards the towing tractor.

Figure 6:
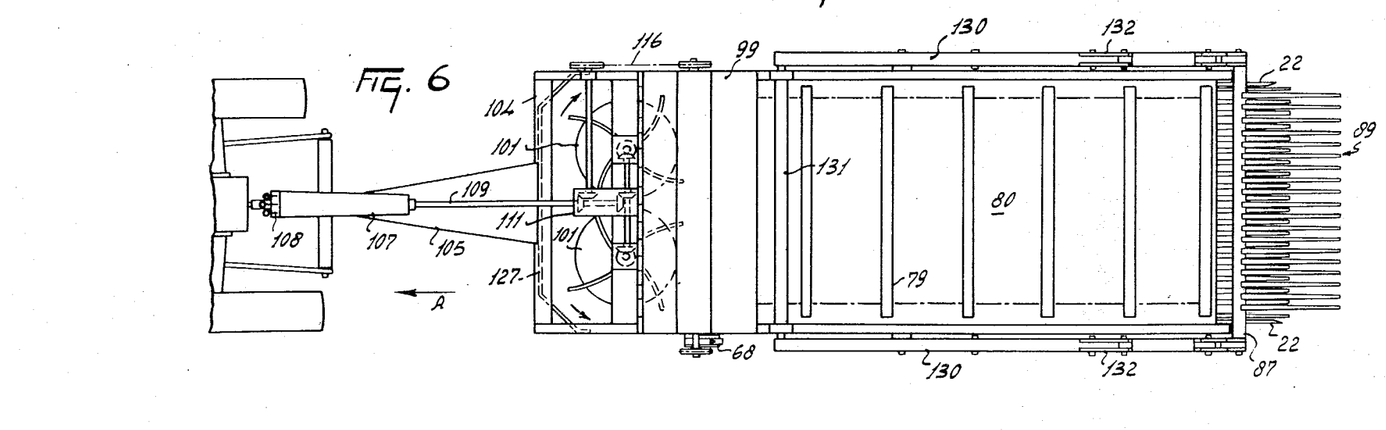
FIG. 6 is a plan view of a further alternative form of pick-up vehicle in accordance with the invention connected to the rear of an agricultural tractor.
Figure 7:
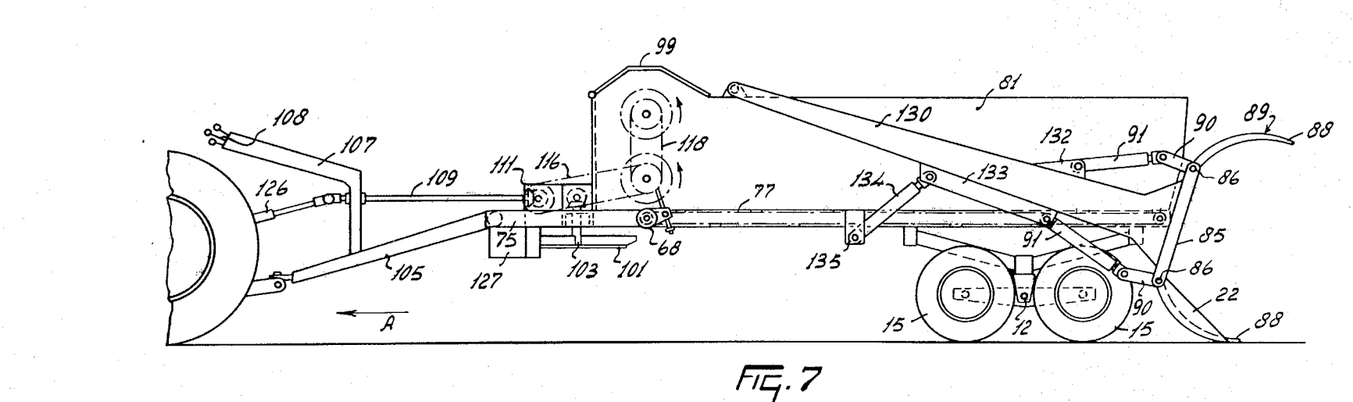
FIG. 7 is a side elevation corresponding to FIG. 6.

FIGS. 6 and 7 of the drawings illustrate an agricultural trailer vehicle in accordance with the invention which is similar in many respects to the vehicle that has already been described with reference to FIGS. 4 and 5. Parts that are similar, or identical, to parts that have already been described are therefore indicated by the same reference numerals as are employed for equivalent parts in the preceding Figures of the drawings. In this embodiment, the loading mechanism of the vehicle is supported by a structure comprising two supporting arms 130 that are located close to the opposite side walls 81 of the chamber 80 so as to be turnable about an axis substantially coinciding with the longitudinal axis of a tube 131 mounted transversely on top of the chamber 80 at a location towards the leading end thereof in a generally similar manner to that which has already been described in connection with the tube 96A. The supporting arms 130 progressively increase in their vertical extent considered in a rearward direction therealong from the tube 131 and have their maximum vertical extents at their rearmost ends where they carry the supports 85. The arms 130 are thus generally similar in construction to the previously described supporting arms 84. It will be noted that, in this embodiment, the tines 88 of the upper gripper member 89 have a somewhat greater radius of curvature than those of the lower gripper member 89. The more pronounced curvature of the lower tines 88 facilitates picking up of material directly from the ground. The upper hydraulic piston and cylinder assemblies 91 by which the upper gripper member 89 is turned about the axis of the stub shafts 86 at the opposite ends of the corresponding tine support 87 have their cylinders pivotally connected to anchorages 132 and the cylinders of the lower assemblies 91 are pivotally connected to anchorages 133 at the bottoms of the arms 130, the anchorages 133 extending lengthwise of the arms 130 for greater distances than the anchorages 132. The ends of the lower anchorages 133 that are closest to the tube 131 are pivotally connected to the piston rods of hydraulic piston and cylinder assemblies 134, the cylinders of which, in turn, are pivotally mounted between the limbs of forked brackets 135 which depend from the longitudinal frame beams 75 at locations approximately midway along the lengths of the latter.

The trailer vehicle that has been described with reference to FIGS. 6 and 7 of the drawings is operated in substantially the same manner as that previously described with reference to FIGS. 4 and 5 thereof, it being noted that, in the embodiment of FIGS. 6 and 7, the supporting arms 130 of the loading mechanism are turned upwardly and downwardly to bring the gripper members 89 to desired levels directly by the piston and cylinder assemblies 134 instead of indirectly through the intermediary of the pivotally mounted plates 95 in the embodiments of FIGS. 4 and 5 of the drawings. It should be noted that, in both the embodiments that have been described with reference to FIGS. 4 to 7 of the drawings, the ground wheels 15 are arranged in a substantially identical manner to the ground wheels 15 of the embodiment of FIGS. 1 to 3 of the drawings so that the vehicles concerned can be towed without difficulty over surfaces of many different kinds including very rough and uneven agricultural or other ground. The two gripper members 89 can be used either separately or in conjunction in pushing material directly into the chamber 80, such material being collected directly from the ground surface or from a stack, heap or the like of material. For example, material can be collected from a stack or heap thereof by employing the upper gripper member 89 to engage a quantity of material and push it towards the mouth of the chamber 80, the upper gripper member 89 subsequently being withdrawn and the lower gripper member 89 being moved towards the chamber 80 with a second quantity of material. The lower gripper member 89 pushes both the first and second quantities of material forwardly into the chamber 80. The lower gripper member is then withdrawn and the upper gripper member supplies a third quantity of material. The whole chamber 80 can be filled quickly and effectively in this way, the moving floor or endless conveyor at the bottom of the chamaber 80 being employed, as required, to carry the collected material inwardly towards the far end of the chamber 80 at which the feeding members 98 for the distributors 101 are located.

Figure 8:
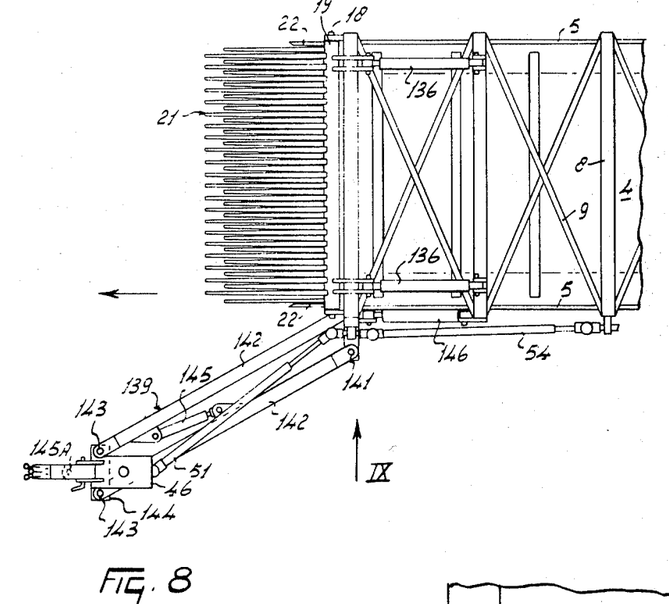
FIG. 8 is a plan view of a leading region of the pick-up vehicle of FIGS. 1 to 3 illustrating an alternative construction for certain parts of that vehicle.
Figure 9:
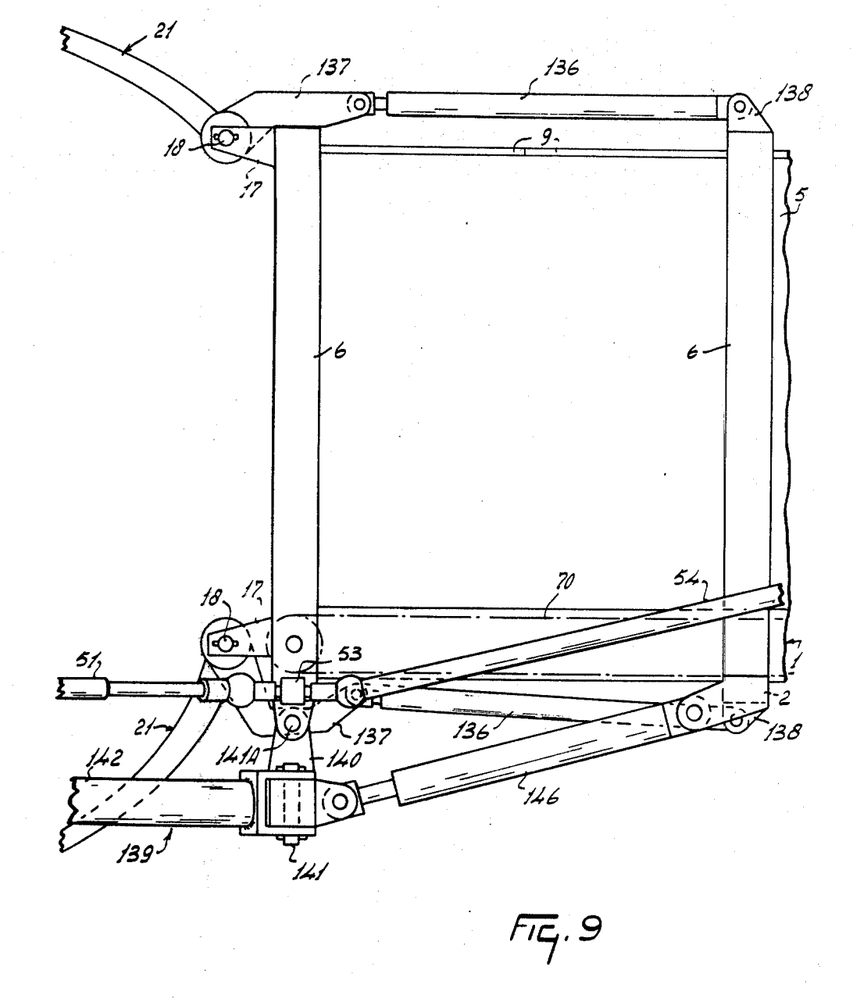
FIG. 9 is a side elevation, to an enlarged scale, as seen in the direction indicated by an arrow IX in FIG. 8.
Figure 10:
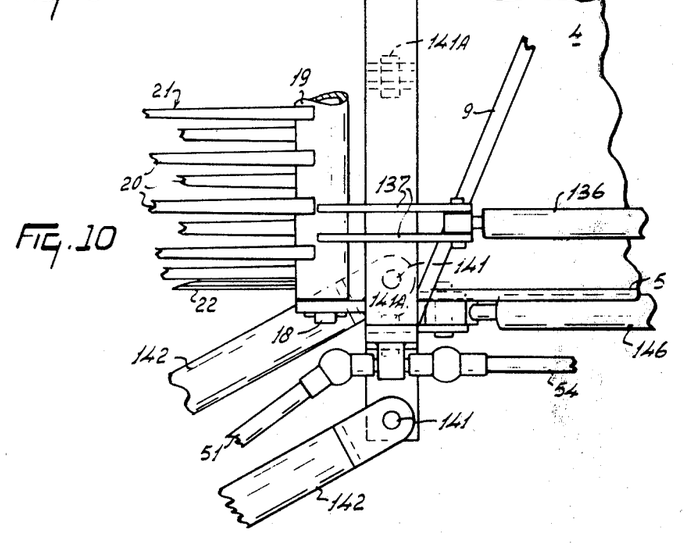
FIG. 10 is a partial plan view, to an enlarged scale, illustrating a draw bar connection and other parts that can be seen in FIG. 8 in greater detail.

FIGS. 8, 9 and 10 of the drawings illustrate the front of an agricultural trailer vehicle which is similar in many respect to the vehicle that has already been described with reference to FIGS. 1 to 3 of the drawings. Accordingly, parts that are similar or identical to parts that have already been described with reference to FIGS. 1 to 3 of the drawings are indicated in FIGS. 8 to 10 thereof by the same numerals that are employed in the former Figures. In the embodiment of FIGS. 8 to 10 of the drawings, each griper member 21 is turnable about an axis coinciding with the coincident axes of the stub shafts 18 at the opposite ends of its tine support 19 by a pair of hydraulic piston and cylinder assemblies 136. Each tine support 19 is provided, at two locations close to its opposite ends, with a pair of arms 137 between the free ends of which pair the free end of the piston rod of the corresponding assembly 136 is pivotally connected. The opposite ends of the cylinders of the four assemblies 136 are pivotally connected to pairs of lugs 138 carried by one of the transverse frame beams 2 and a vertically registering one of the roof beams 8. The piston and cylinder assemblies 136 all extend substantially parallel to one another and to the intended direction of operative travel A when the gripper members 21 are disposed in substantially the positions illustrated in the drawings. In this embodiment, the vehicle has a draw bar 139 which is turnable upwardly and downwardly around a substantially horizontal axis afforded by pivot pins 141A with respect to the load-receiving chamber 4 through the intermediary of a connecting piece 140 (FIG. 9). The forked ends of two parallel beams 142 are pivotally coupled to the connecting piece 140 by corresponding vertical or substantially vertical pivot pins 141, the opposite ends of said beams 142 also being forked and being similarly linked to a coupling member or connecting piece 144 by two vertical or substantially vertical pivot pins 143. The coupling member or connecting piece 144 incorporates a towing eye 145A which could, of course, be replaced by a towing hook or some other member arranged for connection to the tow bar, tool bar or other towing member of an operating agricultural tractor or other vehicle. The parts 140 and 144 and the beams 142 together constitute a parallelogram linkage having an angularity which is adjustable by means of a hydraulic piston and cylinder assembly 145 that is disposed between the two beams 142 with its opposite ends pivotally connected to lugs carried by those beams. Extension and retraction of the piston rod of the assembly 145 causes the draw bar 139 to turn about the pivot pins 141 in a substantially horizontal plane when these pivot pins 141 are substantially vertically disposed. The connecting piece 140 which carries the draw bar 139 is turnable about the axis of the substantially horizontal pivot pins 141A by a hydraulic piston and cylinder assembly 146 that is pivotally mounted between lugs carried by the connecting piece 140 and by one of the transverse frame beams 2.

As in the embodiment of FIGS. 1 to 3 of the drawings, a gear box (not visible) is located beneath the reservoir 46 (FIG. 8) and accommodates a hydraulic pump of an independent hydraulic system of the vehicle. A control, which may incorporate a slip clutch or the like, is also provided for governing the operating of the spreading members and the moving floor or endless conveyor at the bottom of the load-receiving chamber 4. The front of the chamber 4 can be moved upwardly and downwardly to bring the lower gripper member 21 closer to, or further from, the ground surface as may be required by suitable operation of the hydraulic piston and cylinder assembly 146 from one of the control levers 49 carried by the arm 48. However, in this embodiment, the draw bar 139 is located at a lower horizontal level than, the draw bar 38 which has the advantage that, under certain conditions, the gripper members 21, and particularly the lower gripper member 21, can engage and pick up material more easily directly from the ground.

Although, in the embodiments of FIGS. 1 to 3 and 8 to 10 of the drawings, the draw bars 38 and 139 have been described and illustrated as being at the left-hand sides of the corresponding vehicles when those vehicles are viewed from the rear in the direction A, it will be understood that it is within the scope of the invention to provide substantially symmetrically opposite vehicles in which the draw bars are located at the right-hand sides thereof when the corresponding vehicles are viewed from the rear in the direction A.

Various features of the agricultural pick-up trailer vehicles that have been described and that are illustrated in the accompanying drawings will be set forth in the following claims as inventive features but it is emphasized that the invention is not necessarily limited to those features and that it includes within its scope each part of each vehicle that has been described and/or that has been illustrated in the accompanying drawings both individually and in various combinations.

Having thus described my invention, what I claim as new and desire to secure by Letters Patent Of the United States is:

1. An agricultural vehicle comprising a wheeled frame and a load-receiving chamber supported on said frame, a movable loading mechanism supported on said frame adjacent an open side of said chamber, said loading mechanism including at least one gripper member with control means to direct the movements thereof, whereby material can be collected and displaced directly into said chamber, a draw bar pivotally interconnected to said vehicle adjacent said open side, said draw bar being linked to said vehicle through connecting piece means and the latter being displaceable about a substantially horizontal pivot axis, said open side being movable to lowered and raised positions at substantially the level of said gripper member relative to the ground, an endless conveyor supported within said chamber adjacent the bottom thereof.

2. A vehicle as claimed in claim 1, wherein said draw bar is attached to the frame and extends at a level beneath that of said bottom of the chamber.

3. A vehicle as claimed in claim 1, wherein said loading mechanism comprises two gripper members which are pivotally mounted at the front side of the vehicle with respect to the normal direction of forward travel thereof, said gripper members being pivotally mounted laterally and to one side of said draw bar.

4. An agricultural vehicle comprising a wheeled frame and a load-receiving chamber supported on said frame, a movable loading mechanism supported on said frame adjacent an open side of said chamber, said loading mechanism including at least one gripper member and control means to direct the movements thereof whereby material can be collected and displaced directly into said chamber, a draw bar connected to said vehicle laterally of said gripper member, the bottom of said chamber comprising an endless conveyor and said chamber being enclosed with a framework that is resistant to torsional deformation, said gripper member being mounted on a supporting structure that is pivotable about a substantially horizontal axis on said frame with respect to said chamber, said supporting structure being located adjacent the top of said chamber.

5. A vehicle as claimed in claim 4, wherein said horizontal axis extends substantially perpendicular to the normal direction of forward travel of said vehicle and is located between the front and the center of said vehicle when the latter is seen in plan.

6. A vehicle as claimed in claim 4, wherein said gripper members are mounted on a supporting structure and the axis about which said supporting structure is pivotable is located adjacent the bottom of said chamber.

7. A vehicle as claimed in claim 4, wherein said supporting structure comprises two arms that extend substantially parallel to side walls of said chamber.

8. A vehicle as claimed in claim 7, wherein said supporting arms extend rearwardly to a location immediately beyond the rearmost end of said chamber with respect to the normal direction of travel.

9. A vehicle as claimed in claim 4, wherein said draw bar is pivotable about at least one substantially vertical axis.

10. A vehicle as claimed in claim 4, wherein said chamber has a top comprised of stiffening roof beams that extend substantially perpendicular to the direction of normal travel of said vehicle and inclined struts extend between said roof beams and form part of said top.

11. A vehicle as claimed in claim 4, wherein said frame is mounted on a plurality of ground wheels which comprise two wheels arranged in fore and aft tandem relationship, each pair of ground wheels being displaceable about a pivotal axis disposed between the two wheels.

12. A vehicle as claimed in claim 4, wherein said draw bar is attached to the frame to extend at a level beneath that of a bottom floor of said chamber.

13. A vehicle as claimed in claim 4, wherein said gripper member is pivoted to said frame by a pair of hydraulic piston and cylinder assemblies that position and actuate said gripper member, said assemblies being operatively connected to supports of each gripper member adjacent the opposite ends of those supports.

14. An agricultural vehicle comprising a wheeled frame and a load-receiving chamber supported on said frame, a movable loading mechanism supported on said frame adjacent an open side of said chamber, said loading mechanism including at least one gripper member and control means to direct the movements thereof, whereby material can be collected ad displaced directly into said chamber, a draw bar connected to said vehicle laterally of said gripper member, the bottom of said chamber comprising an endless conveyor and said chamber being closed with a framework that is resistant to torsional deformation, said gripper member being mounted on a supporting structure that is pivotable about a substantially horizontal axis on said frame with respect to said chamber, said supporting structure comprising two arms that extend substantially parallel to side walls of said chamber, said supporting arms extending rearwardly to a location immediately behind the rearmost end of said chamber with respect to the normal direction of travel, and two gripper members being provided, the free end of said arms having gripper supports on which said gripper members are pivotably mounted, one above the other.

15. A vehicle as claimed in claim 14, wherein at least one gripper member is pivotable through an angle of not less than 90° and that member extends throughout substantially the whole width of said chamber, each gripper member comprising a support provided with tines that are curved in configuration.

16. A vehicle as claimed in claim 15, wherein there are two gripper members located one above the other and each member has tines that are curved towards one another.

17. A vehicle as claimed in claim 16, wherein the tines of one gripper members have a shorter radius of curvature than those of the other gripper member.

18. A vehicle as claimed in claim 17, wherein a lower gripper member has times with the shorter radius of curvature.

19. A vehicle as claimed in claim 18, wherein the tines of said two gripper members are mounted on their respective supports to intermesh and said tines are uniformly curved throughout their lengths.

20. A vehicle as claimed in claim 16, wherein a lower gripper member has a row of tines with cutting blades at its opposite ends.

21. An agricultural vehicle comprising a wheeled frame and a load-receiving chamber supported on said frame, a movable loading mechanism supported on said frame adjacent an open side of said chamber, said loading mechanism including at least one gripper member and control means to direct the movements thereof, whereby material can be collected and displaced directly into said chamber, a draw bar connected to said vehicle laterally of said gripper member, the bottom of said chamber comprising an endless conveyor and said chamber being enclosed with a framework that is resistant to torsional deformation, said gripper member being mounted on a supporting structure that is pivotable about a substantially horizontal axis on said frame with respect to said chamber, said control means including a hydraulic system with at least one piston and cylinder assembly that is connected to said gripper member to adjust the position of that member, said assembly being connected to the appropriate center of said gripper member.

22. A vehicle as claimed in claim 21, wherein said hydraulic system includes at least one piston and cylinder assembly for pivotally displacing a supporting structure and said loading mechanism includes a pair of opposing gripper members connected to said structure.

23. A vehicle as claimed in claim 21, wherein there are two gripper members and each member has a supporting arm, each arm being connected to a corresponding hydraulic piston and cylinder assembly of said system, said assemblies being located beneath their corresponding arms.

24. An agricultural vehicle comprising a wheeled frame and a load-receiving chamber supported on said frame, a movable mechanism supported on said frame adjacent an open side of said chamber, said loading mechanism including at least one gripper member and control means to direct the movements thereof, whereby material can be collected and displaced directly into said chamber, a draw bar connected to said vehicle laterally of said gripper member, the bottom of said chamber comprising an endless conveyor and said chamber being enclosed with a framework that is resistant to torsional deformation, said draw bar comprising a parallelogram linkage that is angularly displaceable about substantial vertical axes and said control means including a hydraulic system which comprising a piston and cylinder assembly connected to said linkage to adjust the latter's position.

25. A vehicle as claimed in claim 24, wherein said hydraulic system has a pump and a reservoir for fluid pressure medium of said system, control levers in said system for governing the action of said hydraulic piston and cylinder assembly and said pump is connectable to place same in driven connection with a power take-off shaft of a tractor.

26. A vehicle as claimed in claim 25, wherein said draw bar is also pivotable about a substantially horizontal axis relative to said chamber and a further piston and cylinder of the hydraulic system is associated with the draw bar to pivot the draw bar about that axis.

* * * * *